Nov. 28, 1961 K. S. DUNLAP 3,011,155

ELECTRICAL MEMORY CIRCUIT

Filed Nov. 7, 1957 2 Sheets-Sheet 1

INVENTOR
K. S. DUNLAP
BY James S. Falk
ATTORNEY

Nov. 28, 1961 K. S. DUNLAP 3,011,155

ELECTRICAL MEMORY CIRCUIT

Filed Nov. 7, 1957 2 Sheets-Sheet 2

INVENTOR
K. S. DUNLAP
BY James W. Falk
ATTORNEY

United States Patent Office 3,011,155

Patented Nov. 28, 1961

3,011,155
ELECTRICAL MEMORY CIRCUIT

Kermit S. Dunlap, Madison, N.J., assignor to Bell Telephone Laboratories, Incorporated, New York, N.Y., a corporation of New York Filed Nov. 7, 1957, Ser. No. 695,051
8 Claims. (Cl. 340—173)

Figure 1:
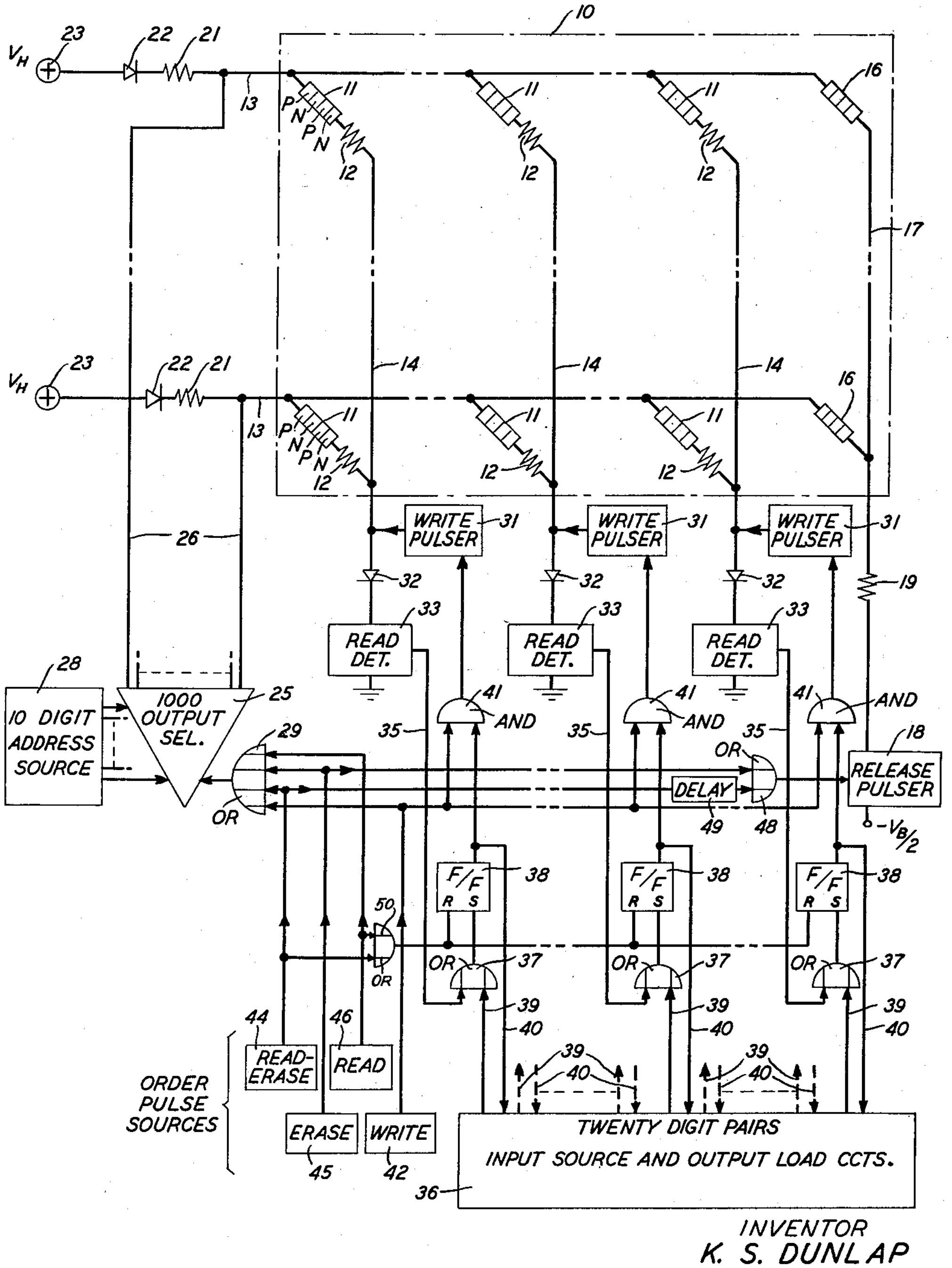

This invention relates to memory or storage circuits and more particularly to such circuits employing fast-access, word-organized memory matrices.

In information handling systems one of the essential components is a large scale storage or memory element. A large number of devices and circuits have been suggested and employed to provide such memory. Magnetic cores, magnetic drums, photographic storage, and condenser and diode arrays are just exemplary of these prior arrangements. One of the problems of most of these prior arrangements has been that, if the memory content can be changed at will, the reading out of the information is destructive, requring a subsequent writing back in of the read-out information. Further, it is desirable to have both fast and random access to any stored information.

It is a general object of this invention to provide an improved memory or storage circuit and, specifically, an improved storage circuit including an array of memory elements.

It is another object of this invention that such an array can be read either destructively or nondestructively without the necessity for regenerating or writing back of read-out information.

It is another object of this invention to provide a storage array having indefinitely long storage time without intermittent regeneration of stored digits and without deterioration of the stored information by reading, writing, or erasing at other storage positions.

Further objects of this invention include reducing the power requirements, decreasing the physical size, and increasing the speed of access and operation of storage circuits of this type.

These and other objects of this invention are attained in one specific illustrative embodiment wherein a fast-access, word-organized memory matrix comprises a plurality of transistor-resistor crosspoints arranged in a coordinate array. Each crosspoint comprises a two-terminal transistor which, together with its series load resistor, has a sharp breakdown characteristic followed by a region of increasing current for increasing applied voltage. Such transistors may be p-n-p-n diffused silicon transistors, sometimes referred to as four-body or four-layer diodes, and have been described in the prior art, as discussed in greater detail below. These transistors, as they shall be herein referred to, together with their load resistors have a stable low current operating characteristic until the breakdown voltage is exceeded, following which they may be maintained in their stable higher current conduction state by a lower voltage. The state of each transistor-resistor crosspoint represents a binary digit or "bit" of information, and related groups of bits making up a word may be represented by the states of a related group of transistor-resistor crosspoints. Advantageously, such transistors may be encapsulated in small units and mounted on printed wiring boards so that a large scale memory, as of the order of 20,000 bits, would be contained in a very small volume. High speed may be obtained, in operation of circuits of my invention, with reading, writing, or erasing times for a single word of 5 microseconds or less.

In one specific illustrative embodiment of my invention, the transistor-resistor crosspoints are arranged in a twenty by one thousand array, providing storage of one thousand words of twenty bits each. Each transistor-resistor crosspoint is connected between a horizontal row lead and a vertical column lead. A hold voltage, sufficient to maintain the crosspoint in its high conducting state after breakdown, is applied to the row lead through a diode and release resistor. A reading detector circuit, activated by a change in current through it, is connected in series with the column lead.

A word or particular row is selected by applying to that row lead a voltage half sufficient to effect breakdown of the crosspoint. When it is desired to write in a corsspoint, a complementary voltage half sufficient to effectuate breakdown of the crosspoint is also applied to the appropriate column lead. When it is merely desired to read information, no voltage is applied to the column lead, the selector voltage on the row lead causing an increase in current through the conducting crosspoint, which increase in current is detected by the read detector circuit.

To erase information, in accordance with one aspect of my invention, an additional column lead is provided and designated a release bus. This release bus is connected through solely a p-n-p-n transistor to each row lead. When an appropriate voltage pulse is applied to the release bus simultaneously with the selection of a particular row, the release transistor breaks down. On removal of the selector pulse from the row, the release transistor then draws current from the hold voltage source through the serially connected release resistor, causing the voltage on the row lead to decrease below the minimum value requisite for maintaining the transistor-resistor crosspoints in their high conduction state.

It is a feature of this invention that a memory matrix comprise a plurality of two-terminal, four-body transistors each in series with a load resistor and connected as crosspoint devices between the column and the row leads of the memory matrix.

It is another feature of this invention that a hold voltage be applied through a release resistor to each row lead, partial breakdown voltages being applied to each row lead for writing or reading of information in a selected row as determined by an input address applied to an associated selector circuit, and that a read detector circuit activated on increase of current through the detector circuit be connected in series with each of the column leads.

It is a further feature of this invention that temporary register circuits be associated with each column lead, output information being applied to the temporary register circuits by the read detector circuits and input information being applied to the temporary register circuits for writing in the transistor-resistor crosspoints by an external input circuit.

It is a still further feature of this invention that a release pulser be connected to a release bus having a two-terminal, four-body transistor connected between the the release bus and each of the row leads for erasure of information in transistor-resistor crosspoints. In accordance with this aspect of my invention, upon selection of a particular row lead and breakdown of the release transistor to that row lead by the concomitantly applied selector pulse and release pulse, the release pulse is applied after cessation of the selector pulse to draw current through the release resistor from the hold voltage source to depress the voltage on the row lead below the minimum necessary to maintain the transistor-resistor cross-points in their high current stable states.

Figure 2:
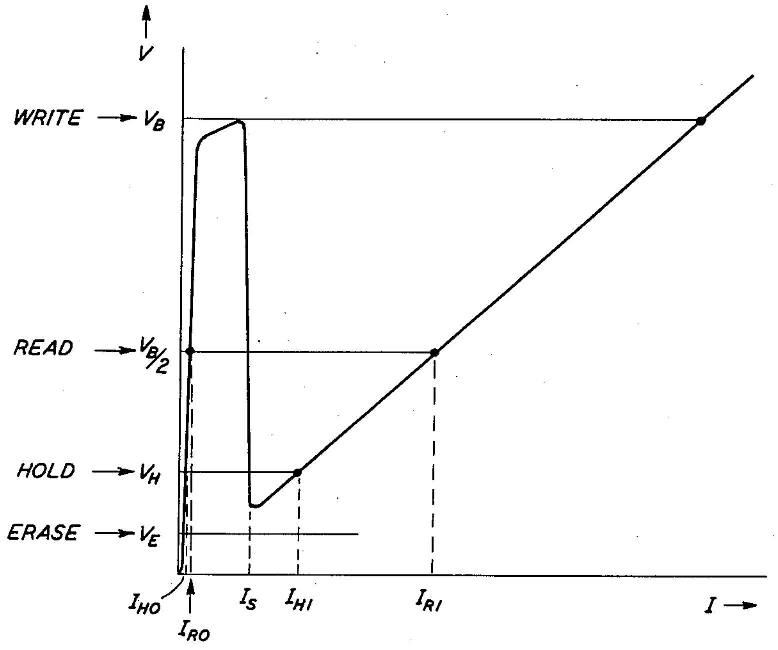

A complete understanding of this invention and of these and various other features thereof may be gained from consideration of the following detailed description and the accompanying drawings, in which:

FIG. 1 is a schematic representation of a word-organized storage matrix and associated control circuits in accordance with one specific illustrative embodiment of my invention; and FIG. 2 is an exemplary plot of the voltage-current characteristic of the two-terminal transistor-resistor crosspoints employed in the embodiment of FIG. 1.

Turning now to the drawing, FIG. 1 depicts in schematic form one illustrative embodiment of my invention comprising a 20,000 bit memory matrix with control circuitry therefor for writing, reading, and erasing. This memory matrix is word organized, each word comprising twenty bits.

The matrix 10 comprises 20,000 two-terminal switching transistors 11, each connected in series with an individual load resistor 12 and connected between the horizontal row leads 13 and the vertical column leads 14 of the matrix. A word is stored in the transistors 11 connected to a single horizontal lead 13, and the individual bits of that word appear on the vertical leads 14.

Each of the switching transistors 11 is advantageously of a four-body or four-layer semiconductive device of the type disclosed in W. Shockley application, Serial No. 548,330, filed November 22, 1955, now Patent No. 2,855,524, and also described in an article "P-N-P-N Transistor Switches," by Moll, Tanenbaum, Goldey, and Holonyak in the Proceedings of the I.R.E., volume 44, No. 9, page 1174 (September 1956), and an article by W. Shockley, "The Four-Layer Diode," in Electronic Industries and Teletech, August 1957, page 58. Such a p-n-p-n switching transistor in series with its load resistor 12 has a voltage-current characteristic as shown in FIG. 2.

In the operation of the memory matrix in accordance with my invention, the transistor is switched to the conducting or "1" state by applying a writing voltage $V_B$ across it of sufficient magnitude that the current through the transistor 11 and its load resistor 12 exceeds the transistor turn-on current $I_S$. The transistor-resistor crosspoint may then be held in the conducting state at a reduced voltage $V_H$. Specifically, the hold voltage is chosen so that the hold current is just greater than the maximum turn-on current.

To return the transistor-resistor crosspoint to the "off" or zero state, the hold voltage is reduced to a value $V_e$ such that the transistor current is less than $I_S$.

In accordance with an important aspect and advantage of my invention, I have found that memory matrices employing transistor-resistor crosspoints can be read nondestructively. This can be seen from the transistor-resistor crosspoint characteristic of FIG. 2. To read the information stored at a crosspoint, the voltage across the transistor and its load resistor is increased from $V_H$ to some value intermediate $V_B$ and $V_H$, such as, for example, $V_B/2$. The stored state can then be detected by noting the change in current through the transistor-resistor crosspoint. The current change in a crosspoint having a stored "1," i.e., a conducting crosspoint, is $I_{R1}-I_{H1}$, whereas the current change in a crosspoint having a stored "0," is only $I_{H0}-I_{R0}$. The difference of these two current changes is sufficient to obtain a reliable read operation. This reading is nondestructive because, turning again to FIG. 2, when the reading voltage $V_B/2$ is removed, the crosspoint returns to the hold $V_H$ condition with the hold current $I_{H1}$ therethrough.

Without the series resistance at each crosspoint the breakdown transistor would have merely a breakdown characteristic, as described in the above-mentioned articles, wherein after breakdown the voltage remains substantially constant for increasing current. However, by utilizing a series resistance at each crosspoint, a positive impedance current limiting characteristic is obtained which enables, in accordance with my invention, nondestructive read-out of the stored state of the crosspoint element by detection of change of current in the crosspoint. In one specific illustrative embodiment of my invention and consistent with the other exemplary parameter values set forth herein, the load resistors may each be of approximately 10,000 ohms.

Further, by utilizing the high resistance load resistor in series with each crosspoint the impedances of the common control leads and busses may remain low, thereby assuring the prevention of sneak current paths and false operation of a crosspoint element on reading or writing at a different crosspoint element in the matrix. Accordingly, the series resistor at each crosspoint both allows nondestructive read-out operation by current detection and prevents false operation of the crosspoint elements.

Turning now again to FIG. 1, the memory matrix 10, in addition to the transistor-resistor crosspoints, also includes a single transistor 16 connected between each row lead 13 and a release bus 17, described further below. The transistors 16 may be the same as transistors 11 but do not have load resistors in series with them. A release pulser 18 is connected through a single resistor 19 to the release bus 17 and thus to all the transistors 16.

Each of the horizontal leads 13 is connected through a resistor 21 and a diode 22 to a source 23 of hold voltage $V_H$ which, in one specific illustrative embodiment, may be of the order of 3.6 volts. A selector 25 has a thousand output leads 26, each connected to one of the thousand row leads 13. The selector is employed to select one of the thousand words in the storage matrix, each word being stored in the transistor-resistor crosspoints common to one of the rows 13. The selector 25 may be of any number of selectors known in the art, including diode tree circuits or other translator circuits for selecting a single output on application thereto of a coded address. In this specific embodiment, the selector is addressed by a ten-digit binary number from the address source 28; when it is desired to select a horizontal row 13, the selector is pulsed by the output of an OR circuit 29, the inputs of which are discussed further below. When the selector 25 is enabled by an address from source 28 and pulsed by the OR circuit 29, a positive pulse $V_B/2$ is applied to the addressed horizontal row lead 13 in the matrix 10. In the specific embodiment being described $V_B/2$ may be of the order of 20 volts. The selector operation is identical for all the orders, i.e., read, erase, write, and read-erase, that may be applied to the matrix. Each of these orders is discussed in detail below.

The diode 22 connected to each of the row leads 13 serves to limit the selector pulse current back into the hold voltage supply 23, and the resistor 21 is a release voltage-dropping resistor, as discussed further below.

Connected to each of the vertical column leads 14 is a write pulser 31 and, through a diode 32, a read detector circuit 33. The output lead 35 of the read detector circuit 33 is connected through an OR circuit 37 to the set lead of a flip-flop circuit 38, which may be a two-transistor bistable multivibrator circuit of the types known in the art. The other input to the OR gates 37 is an information input lead 39 from the input source circuits 36. A lead 40 is also connected from the output of each temporary digit register flip-flop 38 to the output load circuits 36 so that the word read from the memory matrix 10 is available to whatever load or utilization circuits may be employed with the memory system in accordance with my invention. Accordingly, in this specific embodiment when a word is read out of the memory matrix 10, the information pulses appear on the twenty leads 40 at the output circuits 36; and when it is desired to store a new word in the memory matrix 10, the information appears on the twenty input leads 39 from the input source circuits 36.

When a multivibrator or flip-flop circuit 38 is set, it applies a pulse to an AND gate 41 which is also enabled by a control write pulse from write order pulse source 42. The enablement of the AND gate 41 energizes the write pulser 31. The twenty flip-flop circuits 38 form a temporary register to hold digits either to be written into the memory or read out of the memory. The write pulsers, which may be transistor amplifiers or other circuits known in the art, deliver a negative pulse of $V_B/2$ volts, which in this specific embodiment may be of the order of −20 volts, to the vertical column leads 14 on a write order under the condition that the digit flip-flop associated therewith has been set and therefore contains a "1."

The read detector circuit 33 detects a current shift in the column 14 and generates an output pulse to set its associated digit flip-flop 38. Such detector circuits for generating pulses on a change of current at the input are known in the art; one specific type may include an inductor through which the current flows, the increase in voltage across that inductor on change in current flow therethrough being utilized to trigger a transistor amplifier or transistor blocking oscillator or a circuit combination of amplifier and blocking oscillator.

Advantageously, each of the writing pulsers 31, the release pulser 18, and the selector 25, which includes pulsers for each of its one thousand outputs, is designed so that its output pulse applied to the transistor-resistor crosspoints or to the transistors 16 does not have a steep wave front but a sloping wave front to prevent false breakdown of the transistors. Further, the release pulser 18, which may similarly be a transistor amplifier type of circuit, advantageously appears as an open circuit when its input pulse is removed.

Other orders to the memory matrix and control circuitry are supplied from a read-erase order pulse source 44, an erase order pulse source 45, and a read order pulse source 46. Each of these pulse sources is connected as an input to the OR gate 29 so that the selector 25 is energized on the application of any order to select the particular row 13 to which that order pertains, as determined by the address from address source 28. Additionally, the erase order pulse source 45 is directly connected through an OR circuit 48 to the release pulser 18 while the read-erase order pulse source 44 is connected through a delay circuit 49 to the OR gate 48 and thence to the release pulser 18. Further, the read order pulse source 46 and the read-erase order pulse source 44 are connected through OR circuit 50 to the reset input terminals of each of the temporary digit register flip-flops 38.

The operation of the specific illustrative embodiment of my invention described herein can best be understood by consideration of the circuit operation on application of each of the control order pulses from order pulse sources 42, 44, 45, and 46. Considering the write order first, the binary digits to be written into the memory matrix are applied from the input source circuits 36 to the temporary register flip-flops 38 and the word address is applied from address source 28 to the selector 25. When a write order is applied from write order pulse source 42, the write pulsers 31 are enabled through AND gates 41 and apply a pulse of $-V_B/2$ volts on the column leads 14 associated with temporary register flip-flop circuits 38 that have been priorly set and thus have a "1" stored in them. The selector 25 applies a pulse of $+V_B/2$ to the addressed row lead 13 and the transistor-resistor crosspoints at the intersections of the pulsed row and column leads are switched to the "on" or conducting state. When the writing pulses are removed, the row lead 13 is returned to the hold voltage from source 23 and the conducting crosspoints go to their low current hold state. By this operation one word of twenty bits has been entered into the memory as a parallel operation.

When it is desired to read out this word nondestructively, the word address is again applied from source 28 to the selector 25 and a read order pulse applied from read order pulse source 46. The read order pulse is applied through OR circuit 50 to the reset inputs of each of the temporary register flip-flops 38 to clear information priorly stored therein. At the same time the selector is energized and applies a pulse of $+V_B/2$ volts to the selected row lead 13. The current in all the conducting transistor crosspoints connected to this row lead is increased from the hold value to the read value, as priorly described with reference to FIG. 2. This current change is detected by the read detector circuits 33 connected to the column leads 14 and output pulses are generated by the read detectors 33 that set the register flip-flops 38 corresponding to the stored "1's." The current change in any "off" transistor-resistor crosspoint having a stored zero therein is negligible, and no "off" transistor can be set by the reading pulse which, in this embodiment, is only one-half that needed to turn a crosspoint on. When the selector pulse is removed, the current in the conducting or "on" transistor-resistor crosspoints is again returned to the hold state, under control of the hold voltage source 23. Thus, this read operation is nondestructive.

When it is desired to erase or destroy information with respect to a stored word, the selector 25 is addressed by that word address from source 28 as in the other order operations; and when the erase order pulse is applied from erase source 45, the selected row lead 13 is again pulsed $+V_B/2$ volts. At the same time, the erase order pulse is applied through OR circuit 48 to the release pulser which applies a pulse of $-V_B/2$ volts to the release bus 17. The transistor 16 at the intersection of the pulsed row lead 13 and release bus 17 is caused to conduct. In accordance with an aspect of my invention, the release pulse from pulser 18 is slightly longer than the selector pulse from selector 25 so that when the selector pulse ends, the current in the matrix row lead 13 is sufficient to cause a voltage drop across resistor 21 of approximately $V_H$ volts, which in this specific embodiment may be of the order of 3.6 volts. The net voltage on the row lead 13 is then approximately zero volts and all the conducting transistor-resistor crosspoints connected to that row lead 13 are returned to their "off" state and the priorly stored word is erased. The release transistor 16 then is turned off when the release pulse ends because of the advantageously high impedance in the release pulser.

When it is desired to read information out of the storage matrix 10 and simultaneously remove that information from the storage matrix, as in prior destructive readout storage systems, a read-erase order pulse is applied from order pulse source 44 to the selector 25 through OR circuit 29, to the reset inputs of each of the temporary register flip-flops 38 through OR circuit 50, and to the release pulser 18 through delay circuit 49 and OR circuit 48. The operation of the read-erase is essentially the same as the read and erase orders just described except that the release pulse from release pulser 18 appearing on release bus 17 is delayed sufficiently, by the delay circuit 49, so that the selector pulse from selector 25 applied to the addressed row lead 13 will operate the read detector circuit 33 before the erasure of the stored information takes place. With this mode of operation, digits stored in the memory matrix row are transferred to the temporary register circuits 38 and removed entirely from the matrix.

Advantageously, a system in accordance with my invention as described above has low impedances on the matrix leads. This serves several purposes: it prevents destroying the information in a word when reading, writing, or erasing in other word positions; it prevents sneak paths for reading currents; and it limits the loading effects of parallel connected storage elements. In accordance with an aspect of my invention, this is accomplished by placing the load resistors 12 in the memory crosspoints, as well as by making the release resistor 21 of a low impedance, such as 10 ohms, and providing that the input impedance of the read detectors 33 also be of a low impedance value, such as 10 ohms.

To change a single bit in a stored word, the general sequence would be to apply a read and erase order pulse to remove the priorly stored bit from the storage, then to apply the desired information bit from the input source 36 to the appropriate temporary register flip-flop circuit 38 to change the value of the digit in the temporary register, and then to apply a write order pulse to return the new information to the matrix. To change any single bit from a stored "1" to a stored "0," this sequence is advantageously employed. However, to change a single digit from a "0" to a "1," it is sufficient to insert a "1" in the proper flip-flop 38 with all the other digits in the temporary register circuits "0" and apply a write order pulser. This enters a "1" in the proper digit space without changing the remaining information in the stored word.

It is to be understood that the above-described arrangements are merely illustrative of the application of the principles of the invention. Numerous other arrangements may be devised by those skilled in the art without departing from the spirit and scope of the invention.

What is claimed is:

1. A storage circuit comprising a coordinate array of semiconductive breakdown devices, a resistor in series with each of said devices, column and row conductors connected to said array of devices, means for applying a first hold voltage to each row conductor sufficient to maintain conduction of said devices which are in their high current state, means for applying first and second complementary voltages to said column and row conductors respectively to cause selected crosspoints to break down to conduct in their high current state, means connected to said column conductors for detecting an increase in current through said semiconductive devices which are in their high current conducting state on application of said second complementary voltages to said row conductors, a release breakdown device connected to each of said row conductors, a release bus connected to said release breakdown devices, a release pulser connected to said release bus, first order means for applying said second complementary voltages to said row conductors for nondestructive read-out of information in said crosspoints connected to said row conductors, and second order means for applying said second complementary voltages to said row conductors and for energizing said release pulser to cause said release breakdown devices to conduct for destructive read-out of information in said crosspoints connected to said row conductors.

2. A storage circuit in accordance with claim 1 further comprising impedance means connected between said hold voltage means and each of said row conductors.

3. A storage circuit in accordance with claim 2 further comprising delay means connected between said second order means and said release pulser.

4. A storage circuit cmprising a coordinate array of crosspoints, each including a resistor connected in series with a semiconductor device having p-n-p-n conductivity type regions, said crosspoints each having a voltage-current characteristic having a first low current conducting portion, a breakdown portion, and a second high current conducting portion in which increase in voltage causes an increase in current, row and column leads connected to individual of said crosspoints in said array, means for applying a hold voltage to each of said row leads sufficient to maintain said crosspoints in their high current conducting state after breakdown, a selector circuit for applying a partial breakdown voltage to said row leads, write pulser means for applying complementary partial breakdown voltages to said column leads to effect storage of information in individual of said crosspoints, detector means connected to said column leads for detecting an increase in current in said column leads on application of said selector circuit voltage to said row leads for reading out of said stored information from said crosspoints, means for applying address information to said selector circuit to select a particular one of said row leads, temporary register means for each of said column leads, means connecting said detector means to said temporary register means, and means for applying input information to be stored in said array to said temporary register means.

5. A storage circuit comprising a coordinate array of crosspoints, each including a resistor connected in series with a semiconductor device having p-n-p-n conductivity type regions, said crosspoints each having a voltage-current characteristic having a first low current conducting region, a breakdown region, and a second high current conducting region in which increase in voltage causes an increase in current, row and column leads connected to individual of said crosspoints in said array, means for applying a hold voltage to each of said row leads sufficient to maintain said crosspoints in their high current conducting state after breakdown, a selector circuit for applying a partial breakdown voltage to said row leads, write pulser means for applying complementary partial breakdown voltages to said column leads to effect storage of information in individual of said crosspoints, detector means connected to said column leads for detecting an increase in current in said column leads on application of said selector circuit voltage to said row leads for reading out of said stored information, a release bus, a breakdown semiconductor device connected between said release bus and each of said row leads, a release pulser connected to said release bus, and a resistor connected between each of said row leads and said hold voltage means.

6. A storage circuit in accordance with claim 5 further comprising a read-erase order pulse source, means connecting said order pulse source to said selector circuit, and means including a delay circuit connecting said order pulse source to said release pulser.

7. A storage circuit comprising an array of semiconductive devices, a resistor in series with each of said devices, a first set and a second set of conductors connected to said array of devices, means for applying a hold voltage to each of said devices sufficient to maintain conduction in said devices which are in their high current state, means for applying complementary voltages to said first and second set conductors to cause selected devices to conduct in their high current state, means connected to said second set conductors for detecting an increase of current through said semiconductive devices which are in their high current conducting state on application of one of said complementary voltages to said first set of conductors, means for applying a release pulse to each of said first set conductors, said release pulse means comprising a release bus and a semiconductor breakdown device connected between said release bus and each of said first set conductors, and impedance means connected between said hold voltage means and said devices.

8. A storage circuit comprising a coordinate array of semiconductive devices, a resistor in series with each of said devices, column and row conductors connected to said array of devices, means for applying a first hold voltage to each row conductor sufficient to maintain conduction of said devices which are in their high current state, means for applying a second larger voltage selectively to said row conductors, means for applying a third voltage to individual of said column conductors, said second and third voltages when occurring simultaneously being sufficient to cause said semiconductive devices to which they are applied to conduct in their high current state, means connected to said column conductors for detecting an increase in current through said semiconductive devices which are in their high current conducting state on application of only said second voltage thereto, means for applying a release pulse to each of said row conductors, said release pulse means comprising a release bus, a semiconductive device connecting each of said row conductors to said release bus, a release pulser connected to said release bus, means enabling said release pulser simultaneously with application of said second voltage to said row conductors to effect breakdown of said release semiconductive devices, said release pulser remaining enabled after cessation of said second voltage to said row conductors, and impedance means connected between said row conductors and said first voltage applying means for causing the voltage on said row conductors to decrease to a value insufficient to maintain said semiconductive devices in their high current conducting state on passage of current from said release pulse means through said impedance means to said first voltage applying means.

References Cited in the file of this patent

UNITED STATES PATENTS

| | | |
|---|---|---|
| 2,709,042 | Couffignal | May 24, 1955 |
| 2,853,631 | Wallace | Sept. 23, 1958 |
| 2,877,359 | Ross | Mar. 10, 1959 |
| 2,907,000 | Lawrence | Sept. 29, 1959 |
| 2,912,598 | Shockley | Nov. 10, 1959 |

OTHER REFERENCES

"Proceedings of the IRE," October 1954, IRE Standards on Electron Devices: Definitions of Semiconductor Terms, 1954, p. 1508.

Handbook of Semiconductor Electronics by L. P. Hunter, 1956, page 4–1.